United States Patent Office 3,576,720
Patented Apr. 27, 1971

3,576,720
PROCESS FOR THE CONTINUOUS PRODUCTION OF TORULA YEAST FROM COFFEE BERRY WASTE
Karl Wilhelm Emil Fries, San Rafael de Escazu, San Jose, Costa Rica, Central America, assignor to St. Regis Paper Company, New York, N.Y.
No Drawing. Filed Apr. 25, 1969, Ser. No. 819,408
Int. Cl. C12c 11/00
U.S. Cl. 195—82
4 Claims

ABSTRACT OF THE DISCLOSURE

The waste hulls or pulp remaining after the recovery of coffee beans from coffee berries is extracted with water, the extract is then pasteurized by heating and cooled and diluted to produce an extract containing between 1 and 4% sugars, from which the pectin and other colloidal substances are then separated; this extract is then adjusted to a pH between 4.5 and 5.0 by the addition of ammonia to produce a nutrient broth suitable for the growth of torula yeast, which broth is continuously supplied to a fermentation tank in which torula yeast is already growing while portions of the torula yeast that were grown therein together with accompanying spent broth are continuously withdrawn from the fermentation tank. The torula yeast grown on the broth produced from coffee berry waste has a much lighter color than that produced from spent sulfite liquor.

---

The present invention pertains to a process for the production of torula yeast from coffee berry waste. Torula yeast is a source of protein and vitamins in animal and human nutrition and is presently produced commercially from spent sulfite liquor resulting from the digestion of wood in the production of paper by the sulfite process. Torula yeast has also been grown on coffee berry waste, which is the pulp or hulls remaining after the recovery of coffee seeds or beans from coffee berries, which is generally referred to as "brosa" in coffee-growing regions, but no economical process has heretofore been available for the production of torula yeast from such coffee berry waste, the disposal of which is a problem in all coffee-growing regions.

The principal object of the present invention is to provide an economical method for the utilization of coffee berry waste. Another object of the present invention is to provide an economical process for the production of torula yeast from coffee berry waste. Other objects and advantages of the present invention, some of which are referred to specifically hereinafter, will be apparent to those skilled in the art to which it pertains.

I have discovered that *Candida utilis*, the microorganism that is referred to as torula yeast and was formerly known as *Torulopsis utilis*, can be advantageously grown in a nutrient broth prepared from coffee berry waste in a continuous process similar to the process of aerobic submerged fermentation that is used for the commercial production of torula yeast from spent sulfite liquor, as described, for example, in the article entitled "Food Yeast From Spent Sulfite Liquor" by Gordon C. Inskeep, in collaboration with A. J. Wiley, J. M. Holderby, and L. P. Hughes, that was published in Industrial and Engineering Chemistry, vol. 43, No. 8, pages 1702–1711 (August 1951). The torula yeast grown upon such nutrient broth has a much lighter color than that produced from spent sulfite liquor.

In producing torula yeast in accordance with the process of my invention, the coffee berry waste is leached continuously with water. This may be effected in a vertical stainless steel tank or combination of stainless steel tanks and screw conveyors in which the water is passed countercurrently to the flow of the coffee berry waste in the process.

The undissolved solid fibrous material of the coffee berry waste is then separated from the resulting aqueous suspension by means of a fine-mesh wire screen. The liquid portion of the aqueous suspension or juice that is thus obtained is then pasteurized by being passed through a coil of tubes that are maintained at a temperature that is high enough to heat the extract to a temperature between 60° and 85° C. This juice is maintained at temperatures within that range for a period long enough to destroy most of any contaminating microorganisms that it may contain which are susceptible to destruction by such heating. The juice is then cooled and diluted with water is to concentration such that the resulting juice contains between 1 and 4 percent by weight of sugars, and is then passed to a heat exchanger or cooler in which its temperature is reduced to between 40° and 60° C. to inhibit the growth of most of the remaining thermophilic microorganisms that were not affected by the heat treatment. If the process is to be temporarily discontinued or stopped at this point, the juice, in dilute or concentrated form, should be maintained at a temperature between 40° and 60° C.

The cooled pasteurized juice that is thus obtained, which still contains pectin and other colored, finely divided or colloidal substances, is then further clarified by being passed under superatmospheric pressure through a layer of finely divided particles of infusorial or diatomaceous earth such as is sold under the registered trademarks Celite and Super-Cel. This operation can conveniently be conducted continuously in a pressure filter. In this filtering operation, the pectin and other colloidal substances are removed, leaving a clear extract having a faint amber color. I have discovered that it is necessary to separate the pectin and other colloidal substances from the extract at this point, if a product of light color having a high content of torula yeast is to be obtained. The product that is produced from a nutrient broth from which the pectins and other colloidal substances that are separated in this step are not removed contains a much lower content of torula yeast and it has a much darker color.

Ammonia or an aqueous solution of ammonium hydroxide is then added to the extract in such amounts that its pH is between 4.5 and 5.0 at a temperature of approximately 37° C. which is the optimum growth temperature of the organism *Candida utilis*. The extract, which is now the nutrient broth on which the torula yeast is to be grown or cultivated, is charged continuously into a fermentor such as is described in the article by Gordon C. Inskeep et al., and the fermentation, harvesting, and drying of the torula yeast are conducted in any of the conventional manners such as are therein described.

Inasmuch as the foregoing description comprises preferred embodiments of the invention which were selected primarily for purposes of illustration, it is to be understood that the invention is not limited thereto and that modifications and variations may be made therein without departing from its scope, which is to be limited solely by the appended claims.

I claim:
1. In a process for the production of torula yeast by growth of the organism *Candida utilis* in a nutrient broth containing sugars, the improvement which consists in using a nutrient broth prapared by extraction of coffee berry waste with water and removal of the pectins and similar colloidal substances from the resulting sugar-containing extract.

2. A process as defined in claim 1 in which the pectins and similar colloidal substances are removed from the sugar-containing extract by filtration through finely divided particles of infusorial or diatomaceous earth.

3. A process as defined in claim 1 in which the sugar-containing extract from which the pectins and similar colloidal substances were removed is pasteurized by heating at a temperature between 60° and 85° C. and is then cooled to a temperature between 40° and 60° C.

4. A process as defined in claim 1 in which the operations are conducted in a continuous manner.

References Cited

Inskeep, G. C.: "Food Yeast From Spent Sulfite Liquor," Industrial and Engineering Chemistry, vol. 43, No. 8, pp. 1702–1711, August 1951.

A. LOUIS MONACELL, Primary Examiner

S. RAND, Assistant Examiner